(12) United States Patent
Parker

(10) Patent No.: US 9,116,026 B1
(45) Date of Patent: Aug. 25, 2015

(54) MEASURING DEVICE

(71) Applicant: Paul Albert Parker, Houston, TX (US)

(72) Inventor: Paul Albert Parker, Houston, TX (US)

( * ) Notice: Subject to any disclaimer, the term of this patent is extended or adjusted under 35 U.S.C. 154(b) by 317 days.

(21) Appl. No.: 13/762,091

(22) Filed: Feb. 7, 2013

Related U.S. Application Data

(60) Provisional application No. 61/597,322, filed on Feb. 10, 2012.

(51) Int. Cl.
*G01B 3/04* (2006.01)
*G01B 3/08* (2006.01)
*B25H 7/00* (2006.01)
*G01D 21/02* (2006.01)

(52) U.S. Cl.
CPC ............ *G01D 21/02* (2013.01); *G01B 3/04* (2013.01); *G01B 3/08* (2013.01)

(58) Field of Classification Search
CPC ............ G01B 3/04; G01B 3/08; G01D 21/02; B25H 7/00
USPC ........... 33/403, 418, 419, 425, 427, 451, 452, 33/460, 461, 462, 464, 483, 484, 485, 489, 33/490, 491, 562, 809
See application file for complete search history.

(56) References Cited

U.S. PATENT DOCUMENTS

| | | | | |
|---|---|---|---|---|
| 149,532 A * | 4/1874 | Sherwin | ........................... | 33/809 |
| 1,190,941 A * | 7/1916 | Needham | ........................ | 33/427 |
| 1,616,820 A * | 2/1927 | Owen | ............................. | 33/462 |
| 1,653,016 A * | 12/1927 | Mellor | ............................. | 33/485 |
| 2,686,973 A * | 8/1954 | Christianson et al. | .......... | 33/461 |
| 3,507,045 A * | 4/1970 | Rives | ............................... | 33/491 |
| 3,818,598 A * | 6/1974 | Hershire | ........................ | 33/494 |
| 6,134,797 A * | 10/2000 | Boyce | ............................. | 33/464 |
| 6,237,237 B1 * | 5/2001 | McKenna et al. | ............... | 33/374 |
| 7,082,692 B2 * | 8/2006 | Shapiro | ........................... | 33/473 |
| 7,788,817 B2 * | 9/2010 | Hsu | .................................... | 33/483 |
| 8,046,929 B2 * | 11/2011 | Yowonske | ...................... | 33/374 |
| 8,122,611 B1 * | 2/2012 | Kallsen | .......................... | 33/526 |
| 8,832,950 B1 * | 9/2014 | Adams | ............................. | 33/462 |
| 2002/0170189 A1 * | 11/2002 | Cheatham | ...................... | 33/194 |
| 2005/0115091 A1 * | 6/2005 | Harris | ............................... | 33/461 |
| 2009/0106993 A1 * | 4/2009 | McKenna et al. | ............... | 33/427 |
| 2010/0325905 A1 * | 12/2010 | Coyle | ............................. | 33/332 |

FOREIGN PATENT DOCUMENTS

JP            02269266 A  * 11/1990 ............. E04F 21/26

* cited by examiner

*Primary Examiner* — R. A. Smith
(74) *Attorney, Agent, or Firm* — Buskop Law Group, PC; Wendy Buskop

(57) ABSTRACT

A measuring device that has an upper guide movably engaged with a lower guide. The upper guide is extendable relative to the lower guide in a first direction along a first axis, and retractable relative to the lower guide in a second direction along the first axis. The upper guide and lower guide form a straightedge that is adjustable. The measuring device includes one or more rulers and levels. A locking mechanism operatively engages with the upper guide and lower guide. The locking mechanism is configured to lock and maintain a position of the upper guide relative to the lower guide and unlock to allow extension and retraction of the upper guide relative to the lower guide. The units of rulers on the upper guide can increase along the second direction, and the units of the rulers on the lower guide can increase along the first direction.

19 Claims, 13 Drawing Sheets

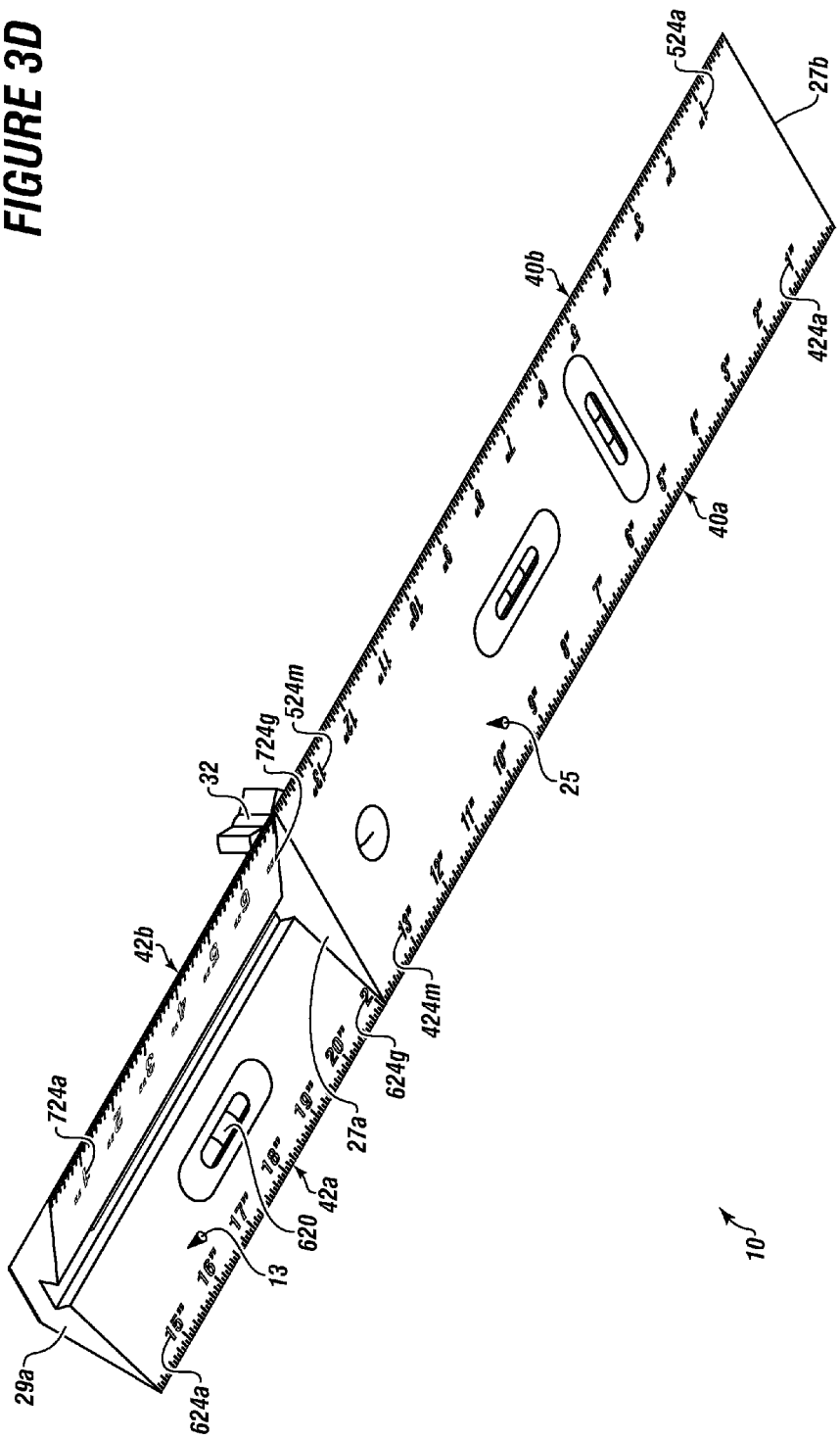

MEASURING DEVICE

CROSS REFERENCE TO RELATED APPLICATION

The current application claims priority to the benefit of U.S. Provisional Patent Application Ser. No. 61/597,322 filed on Feb. 10, 2012, entitled "MEASURING, LEVELING, AND STRAIGHTEDGE DEVICE". This reference is hereby incorporated in its entirety.

FIELD

The present embodiments generally relate to a measuring device.

BACKGROUND

A need exists for a measuring device that can simultaneously provide for measuring, leveling, and use of a straightedge.

A further need exists for a measuring device that can extend and retract, and can be held or locked at various points of extension and retraction.

A further need exists for a measuring device having a profile configured to engage within a corner of two surfaces, allowing for measuring, leveling, and straightedge use in corners.

A further need exists for a measuring device that has a plurality of levels extending in multiple directions, allowing for simultaneous leveling in multiple directions.

A further need exists for a measuring device having an upper guide with one or more rulers having units increasing in a second direction and a lower guide with one or more rulers having units increasing in a first direction.

The present embodiments meet these needs.

BRIEF DESCRIPTION OF THE DRAWINGS

The detailed description will be better understood in conjunction with the accompanying drawings as follows:

FIG. 3D depicts a bottom perspective view of the measuring device of FIG. 3A in an extended position.

Figure 1A:
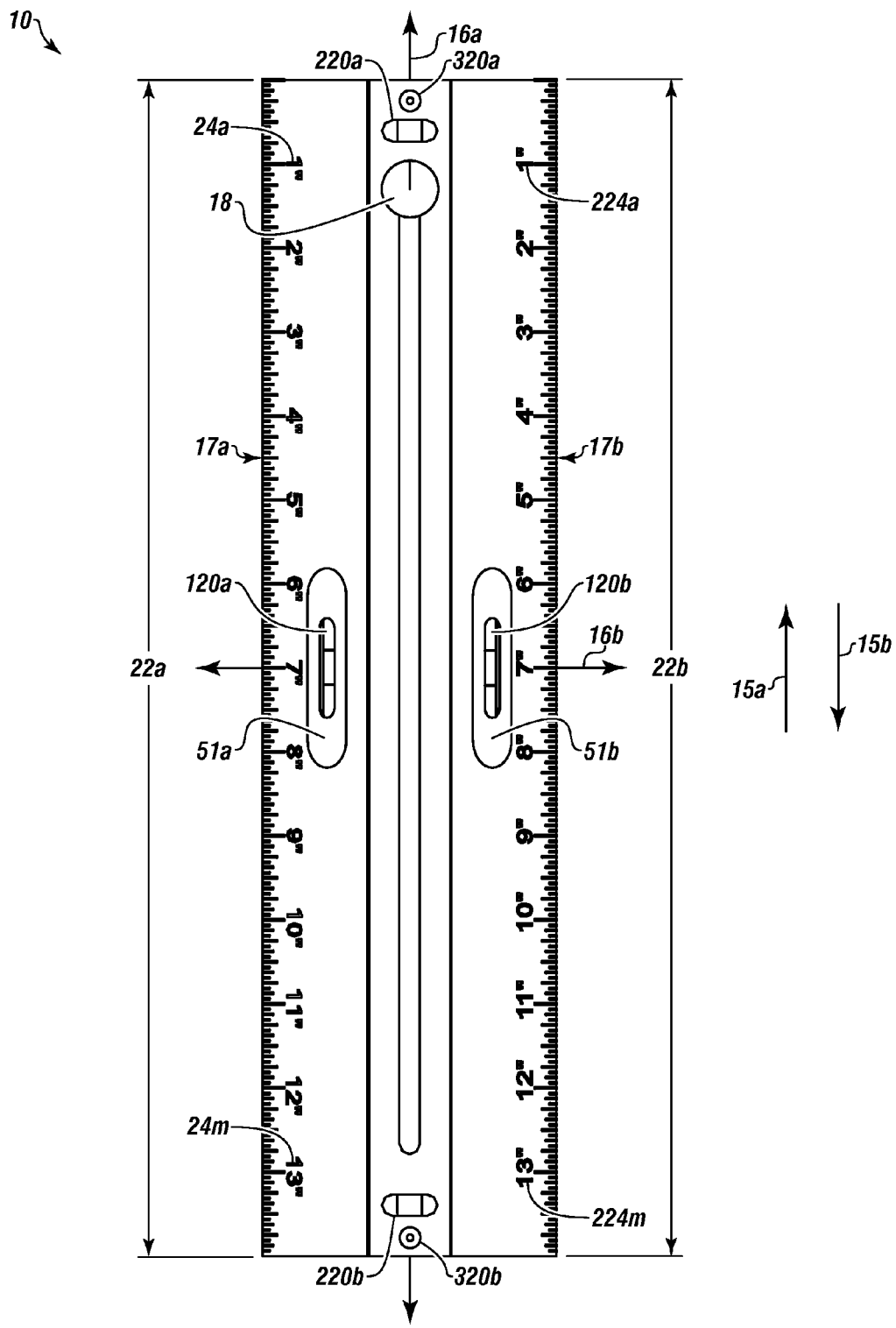
FIG. 1A depicts a top view of an embodiment of the measuring device in a retracted position.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to a measuring device.

The measuring device can be extendable, retractable, and lockable. The measuring device can function as a ruler, a straightedge, and a template.

The measuring device can be a two-part measuring device. The measuring device can include an upper guide movably engaged with a lower guide. For example, the upper guide can be movably engaged with the lower guide via a boss and groove connection.

The upper guide can have an upper top surface and an upper bottom surface. The upper guide can be made of wood, metal, plastic, other materials, or combinations of materials having sufficient strength and durability for operation of the measuring device.

The lower guide can have a lower top surface and a lower bottom surface. The lower guide can be made of wood, metal, plastic, other materials, or combinations of materials having sufficient strength and durability for operation of the measuring device.

The upper bottom surface can be movably engaged with the lower top surface. As such, the upper guide can be extendable relative to the lower guide in a first direction along a first axis. Also, the upper guide can be retractable relative to the lower guide in a second direction along the first axis. The second direction can be opposite the first direction.

The measuring device can include one or more straightedges. The one or more straightedges can allow for testing of straight lines and surfaces, cutting along straight lines and surfaces, and drawing straight lines on surfaces.

The measuring device can include a locking mechanism, which can be operatively engaged with the upper guide and the lower guide. The locking mechanism can be a friction fit. For example, the upper guide and the lower guide can each have tolerances configured such that a force above a preset limit is required to move the upper guide relative to the lower guide.

The locking mechanism can be configured to lock to maintain a position of the upper guide relative to the lower guide. The locking mechanism can be configured to unlock to allow extension and retraction of the upper guide relative to the lower guide.

The locking mechanism can include a locking knob threadably engagable and disengagable with a locking bolt, a cam lock, a spring loaded device, or the like.

In operation, the measuring device can be used to provide a measurement of a distance without requiring a numerical identification of the measurement. For example, if a piece of wood needs to be cut to fit within a specific space having a specific distance, the measuring device can be placed within the space and extended such that a first end of the measuring device engages a first boundary of the space and a second end of the measuring device engages a second boundary of the space. The measuring device can then be locked into place at a length equivalent to the distance. The piece of wood can then be placed next to the measuring device, marked then cut to the same length as the measuring device; thereby forming a piece of wood having a distance equivalent to the distance of the space.

The measuring device can include one or more levels disposed in or on the upper guide, the lower guide, or combinations thereof. For example, a portion of the one or more levels can be disposed in or on the upper top surface and can be axially aligned with the first axis. The one or more levels aligned with the first axis can be operatively positioned on the upper guide.

The measuring device can include one or more levels disposed in or on the upper top surface, which can be axially aligned with a second axis. The second axis can be perpendicular to the first axis. As such, the measuring device can provide for leveling along the first axis and the second axis. The one or more levels aligned with the second axis can be operatively positioned on the upper guide.

Each of the levels discussed herein can be an electronic level, a spirit level, a bubble level, or other similar leveling means.

The measuring device can include one or more upper rulers disposed on the upper top surface having units. The units of the upper rulers can increase in the second direction along the first axis.

The measuring device can include one or more lower rulers disposed on the lower top surface having units. The units of the lower rulers can increase in the first direction along the first axis. As such, the measuring device can allow for measuring of a distance between a surface and a first upper end of the upper guide, and for measuring of a distance between the surface and a second upper end of the upper guide.

The units on the one or more rulers described herein can be inches, feet, yards, millimeters, centimeters, meters, other distance units, or combinations thereof.

In one or more embodiments, the upper top surface can have a flat top surface extending along the first axis, a first upper angled top surface connected with the flat top surface and disposed at a first upper angle from the flat top surface, and a second upper angled top surface connected with the flat top surface opposite the first upper angled top surface and disposed at a second upper angle from the flat top surface.

The first upper angle and the second upper angle can each be forty five degree angles; thereby allowing the first upper angled top surface to engage a first surface of a corner, and the second upper angled top surface to engage a second surface of the corner for use of the measuring, leveling, and straightedge device in corners. The measuring device can be used with square corners.

The lower bottom surface can be a flat surface configured to engage flush with a work surface, such as a board being measured and cut.

Figure 1B:
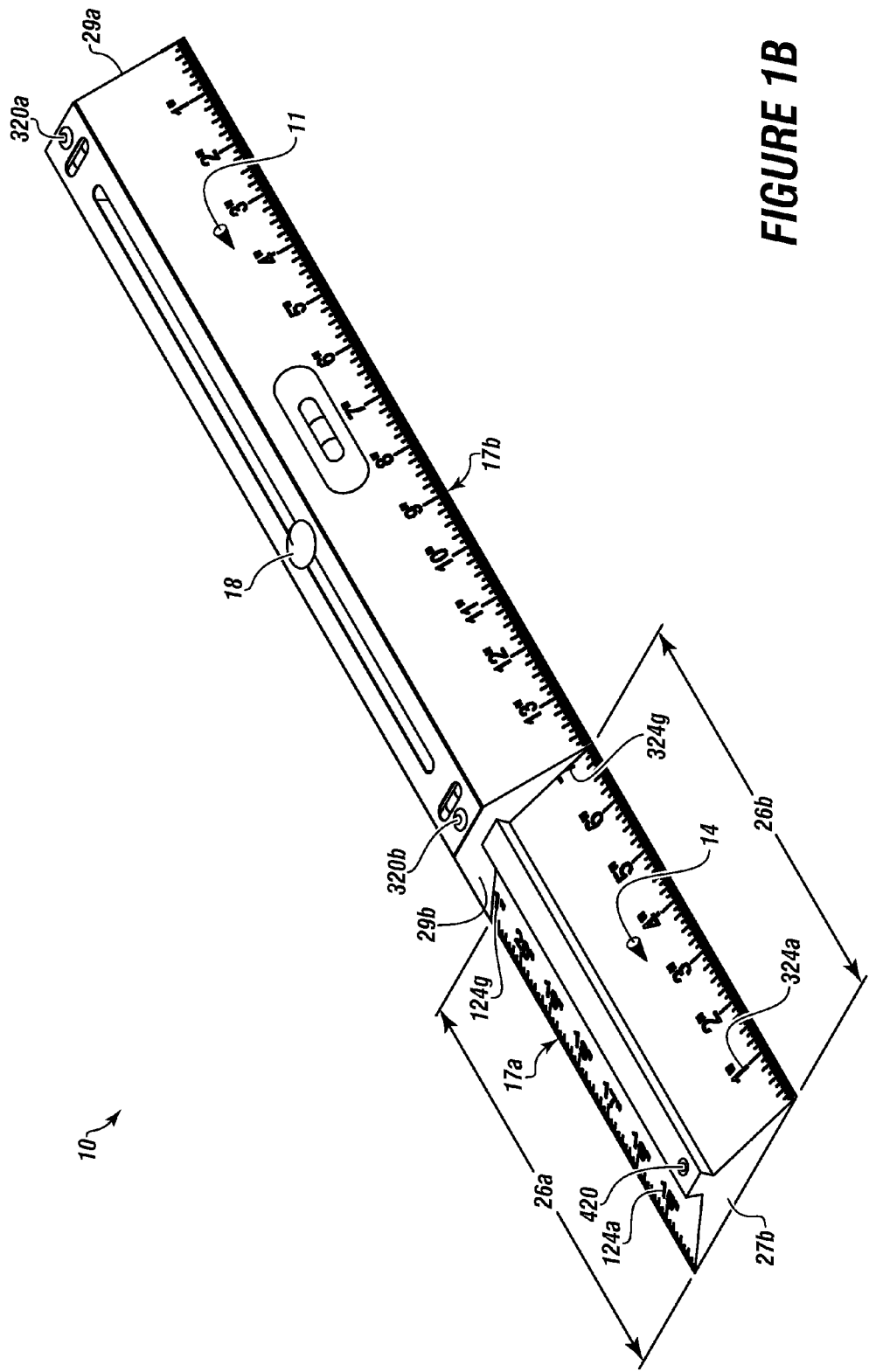
FIG. 1B depicts a perspective view of the measuring device of FIG. 1A in an extended position.

Turning now to the Figures, FIG. 1A depicts a top view of an embodiment of the measuring device 10 in a retracted position, and FIG. 1B depicts a perspective view of the measuring device 10 of FIG. 1A in an extended position.

The measuring device 10 can include an upper guide 11 and a lower guide 14.

The upper guide 11 can have a first upper end 29a and a second upper end 29b opposite the first upper end 29a. The lower guide 14 can have a first lower end (not shown) and a second lower end 27b opposite the first lower end.

The upper guide 11 can be movably engaged with the lower guide 14.

In operation, the upper guide 11 can be extendable relative to the lower guide 14 in a first direction 15a along a first axis 16a. The upper guide 11 can be retractable relative to the lower guide 14 in a second direction 15b along the first axis 16a. The second direction 15b can be opposite the first direction 15a.

A first straightedge 17a can be formed along a first side of the upper guide 11, the lower guide 14, or combinations thereof. In operation, a length of the first straightedge 17a can be increased by extending the upper guide 11 relative to the lower guide 14.

The measuring device 10 can include a locking mechanism 18, which can be operatively engaged with the upper guide 11 and the lower guide 14. The locking mechanism 18 can be configured to lock to maintain a position of the upper guide 11 relative to the lower guide 14. The locking mechanism 18 can be configured to unlock to allow extension and retraction of the upper guide 11 relative to the lower guide 14.

The measuring device 10 can include one or more first levels 120a and 120b operatively positioned on the upper guide 11. For example, the first levels 120a and 120b can be disposed in or on the upper guide 11, and can be axially aligned with the first axis 16a.

In one or more embodiments, the measuring device 10 can include one or more side plates 51a and 51b for containing the first levels 120a and 120b. The side plates 51a and 51b can be made of wood, metal, plastic, other materials, or combinations of materials having sufficient strength and durability for operation of the measuring device 10.

The measuring device 10 can include one or more second levels 220a and 220b operatively positioned on the upper guide 11. For example, the second levels 220a and 220b can be disposed in or on the upper guide 11, and can be axially aligned with a second axis 16b. The second axis 16b can be perpendicular to the first axis 16a.

The measuring device 10 can include one or more third levels 320a and 320b disposed in or on a portion of the upper guide 11, such as bubble levels.

In one or more embodiments, the measuring device 10 can include one or more fourth levels 420 disposed in or on a portion of the lower guide 14, such as bubble levels.

As such, the upper guide 11 can be configured to have one or more spirit levels aligned along the first axis 16a, such as the first levels 120a and 120b, one or more spirit levels aligned along the second axis 16b, such as the second levels 220a and 220b, and one or more bubble levels, such as the third levels 320a and 320b and the fourth levels 420; thereby allowing for leveling along a plurality of axes.

The measuring device 10 can include a first upper ruler 22a disposed on a portion of the upper guide 11 at or proximate the first straightedge 17a. The first upper ruler 22a can have first units 24a-24m that increase in the second direction 15b along the first axis 16a. For example, the first unit 24a can be one inch and the first unit 24m can be thirteen inches.

The measuring device 10 can include a first lower ruler 26a disposed on a portion of the lower guide 14 at or proximate the first straightedge 17a. The first lower ruler 26a can have second units 124a-124g that increase in the first direction 15a along the first axis 16a.

In one or more embodiments, the second units 124a-124g can be configured to allow for measurement of a distance along the first axis 16a beyond a length of the upper guide 11. For example, the second units 124a-124g of the first lower ruler 26a can be sequential with the first units 24a-24m of the first upper ruler 22a. In operation, a user can extend the upper guide 11 relative to the lower guide 14. As such, the second upper end 29b can be aligned with one of the second units 124a-124g to provide a measurement between the second lower end 27b and the first upper end 29a. For example, if the upper guide 11 is configured to measure fourteen inches, the second unit 124a can be a marker for fifteen inches and the second unit 124g can be a marker for twenty-one inches. As such, in this example, when the second upper end 29b is aligned with the second unit 124g, the distance between the second lower end 27b and the first upper end 29a is twenty-one inches.

The measuring device 10 can include a second straightedge 17b, which can be formed along a second side of the upper guide 11, the lower guide 14, or combinations thereof. In operation, a length of the second straightedge 17b can be increased by extending the upper guide 11 relative to the lower guide 14.

The measuring device 10 can include a second upper ruler 22b disposed on a portion of the upper guide 11 at or proximate the second straightedge 17b. The second upper ruler 22b can have third units 224a-224m that increase in the second direction 15b along the first axis 16a.

The measuring device 10 can include a second lower ruler 26b disposed on a portion of the lower guide 14 at or proximate the second straightedge 17b. The second lower ruler 26b can have fourth units 324a-324g that increase in the first direction 15a along the first axis 16a.

In one or more embodiments, the fourth units 324a-324g can begin at zero at the second lower end 27b. As such, a user can measure a distance between the second lower end 27b and the second upper end 29b, which can be used to measure a distance from a wall, a corner, or any other point or surface engaged with the second lower end 27b.

In one or more embodiments, the measuring device 10 can be used to provide measurements of distances from each end of the measuring device 10. For example, the measuring device 10 can be placed within a space, such as a doorway. The second lower ruler 26b can be used to measure a first distance from a first edge of the doorway towards a center of the doorway, and the second upper ruler 22b can be used to measure a second distance from a second edge of the doorway towards the center of the doorway. As such, the measuring device 10 can be used for centering objects within spaces, such as centering a rug or carpet within the doorway.

In one or more embodiments, the first upper ruler 22a and the second upper ruler 22b can be attached to the upper guide 11 via an adhesive and the first lower ruler 26a and the second lower ruler 26b can be attached to the lower guide 14 via the adhesive. In one or more embodiments, the first upper ruler 22a, the second upper ruler 22b, the first lower ruler 26a, and the second lower ruler 26b can be screwed, fastened, etched, engraved, or otherwise disposed on or in the measuring device 10.

In operation, when the upper guide 11 is retracted relative to the lower guide 14, the first units 24a-24m can allow for measuring of a distance from the first upper end 29a to the second upper end 29b.

Figure 2A:
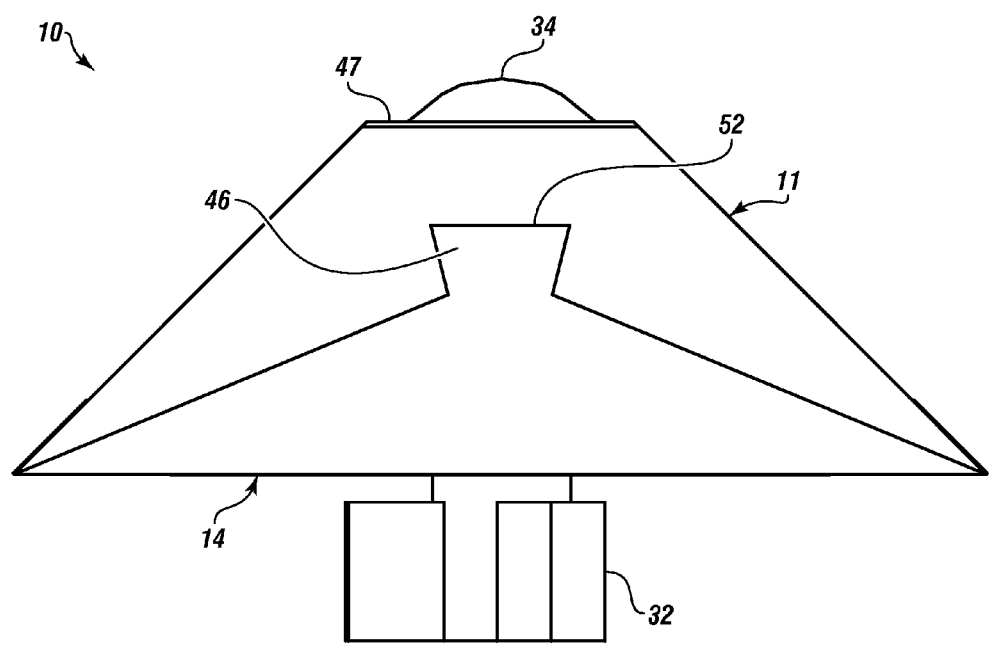
FIG. 2A depicts an end view of an embodiment of the measuring device with an upper guide engaged with a lower guide.
Figure 2B:
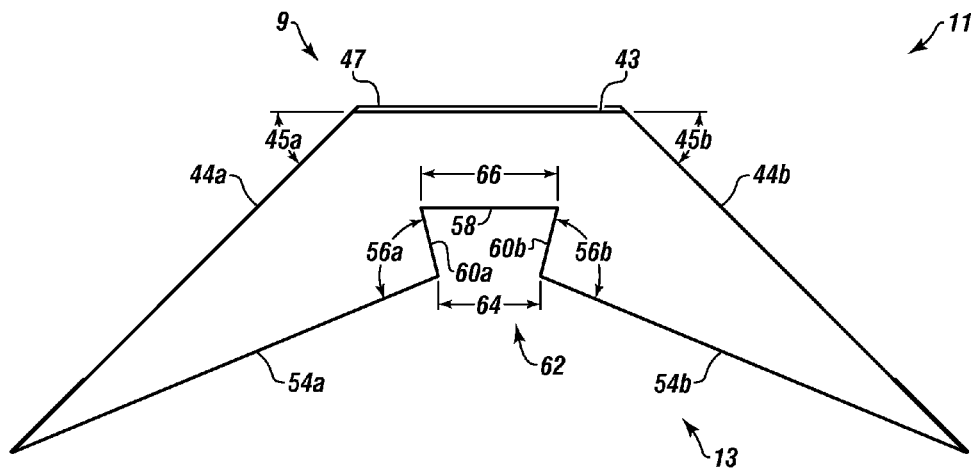
FIG. 2B depicts an end view of an embodiment of the upper guide disengaged from the lower guide.
Figure 2C:
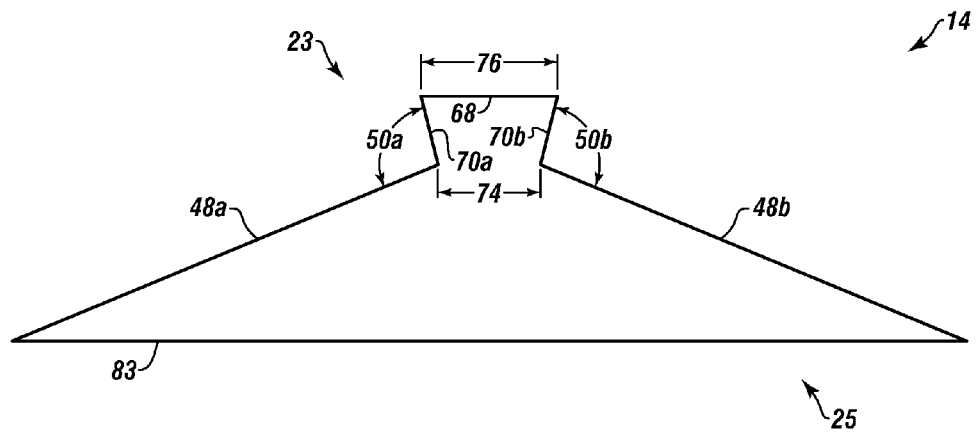
FIG. 2C depicts an end view of an embodiment of the lower guide disengaged from the upper guide.

FIG. 2A depicts an end view of an embodiment of the measuring device 10 with the upper guide 11 engaged with the lower guide 14, FIG. 2B depicts an end view of an embodiment of the upper guide 11 disengaged from the lower guide, and FIG. 2C depicts an end view of an embodiment of the lower guide 14 disengaged from the upper guide.

The upper guide 11 can have a profile configured to engage within a corner of two surfaces. For example, the upper guide 11 can have an upper top surface 9 and an upper bottom surface 13.

The upper top surface 9 can include a flat top surface 43, a first upper angled top surface 44a, and a second upper angled top surface 44b.

The flat top surface 43 can extend along the first axis.

The first upper angled top surface 44a can be connected with the flat top surface 43. The first upper angled top surface 44a can be disposed at a first upper angle 45a from the flat top surface 43.

The second upper angled top surface 44b can be connected with the flat top surface 43 opposite the first upper angled top surface 44a. The second upper angled top surface 44b can be disposed at a second upper angle 45b from the flat top surface 43. The first upper angle 45a can be equal to the second upper angle 45b.

In one or more embodiments, the first upper angle 45a and the second upper angle 45b can both be forty five degree angles; thereby allowing the first upper angled top surface 44a to engage a first surface of a corner and the second upper angled top surface 44b to engage a second surface of the corner for use of the measuring device 10 in corners formed by surface disposed perpendicular to each other.

In one or more embodiments, the measuring device 10 can include a close out plate 47 disposed over a portion of the upper top surface 9. The close out plate 47 can extend along the first axis on the upper top surface 9, and can contain the first levels. The close out plate 47 can be made of wood, metal, plastic, other materials, or combinations of materials having sufficient strength and durability for operation of the measuring device 10. A locking bolt 34 can be located on the close out plate 47. The locking bolt 34 can be engaged with the locking knob 32.

The lower guide 14 can be configured to engage with the upper guide 11.

For example, the lower guide 14 can have a lower top surface 23 and a lower bottom surface 25, and the lower top surface 23 can be configured to engage with the upper bottom surface 13.

The lower guide 14 can have a boss 46 formed or disposed on the lower top surface 23 that can extend along the first axis. The boss 46 can be configured to movably engage with a groove 52 of the upper guide 11. The groove 52 can be formed in the upper bottom surface 13, and can extend along the first axis. As such, the upper guide 11 can be movably engaged with the lower guide 14 via the groove 52 and the boss 46, forming a boss and groove connection.

The lower top surface 23 can have a first lower angled top surface 48a, which can be connected with the boss 46. The first lower angled top surface 48a can be disposed at a first lower angle 50a from a boss top surface 68.

The lower top surface 23 can have a second lower angled top surface 48b, which can be connected with the boss 46 opposite the first lower angled top surface 48a. The second lower angled top surface 48b can be disposed at a second lower angle 50b from the boss top surface 68.

The upper bottom surface 13 can have a first upper angled bottom surface 54a, which can be connected with the groove 52. The first upper angled bottom surface 54a can be disposed at a first upper bottom angle 56a equivalent to the first lower angle 50a; thereby allowing the first upper angled bottom surface 54a to engage flush or substantially flush with the first lower angled top surface 48a.

The upper bottom surface 13 can have a second upper angled bottom surface 54b, which can be connected with the groove 52 opposite the first upper angled bottom surface 54a. The second upper angled bottom surface 54b can be disposed at a second upper bottom angle 56b equivalent to the second lower angle 50b; thereby allowing the second upper angled bottom surface 54b to engage flush or substantially flush with the second lower angled top surface 48b.

In one or more embodiments, the groove 52 can have a groove top surface 58, a groove first wall 60a connected with the groove top surface 58, and a groove second wall 60b connected with the groove top surface 58 opposite the groove first wall 60a.

A groove opening 62 can be formed between the groove first wall 60a and the groove second wall 60b. The groove opening 62 can have a groove opening width 64 that is less than a groove top surface width 66.

In one or more embodiments, the boss 46 can have a boss first wall 70a connected with the boss top surface 68, and a boss second wall 70b connected with the boss top surface 68 opposite the boss first wall 70a.

The boss 46 can have a boss bottom width 74 that is less than a boss top surface width 76.

The boss top surface width 76 can be greater than the groove opening width 64; thereby allowing the boss 46 to lockingly engage with the groove 52.

The first lower end and the second lower end of the lower guide 14 can each form a lower end straightedge 83; allowing for testing straight lines and surfaces, cutting along straight lines and surfaces, or drawing straight lines on surfaces using the lower end straightedge 83.

Figure 3A:
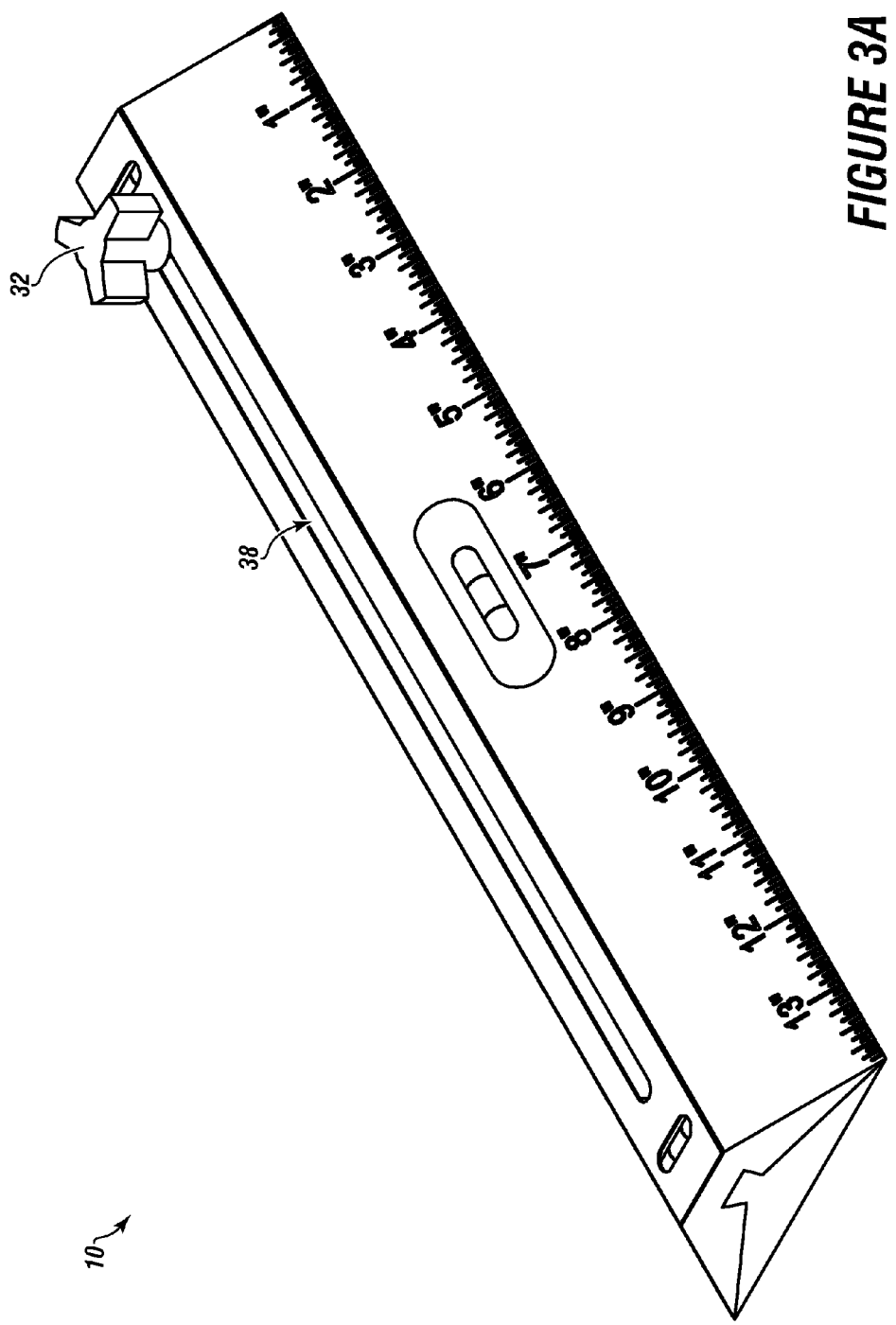
FIG. 3A depicts a top perspective view of an embodiment of the measuring device having a locking knob disposed above the upper guide.
Figure 3B:
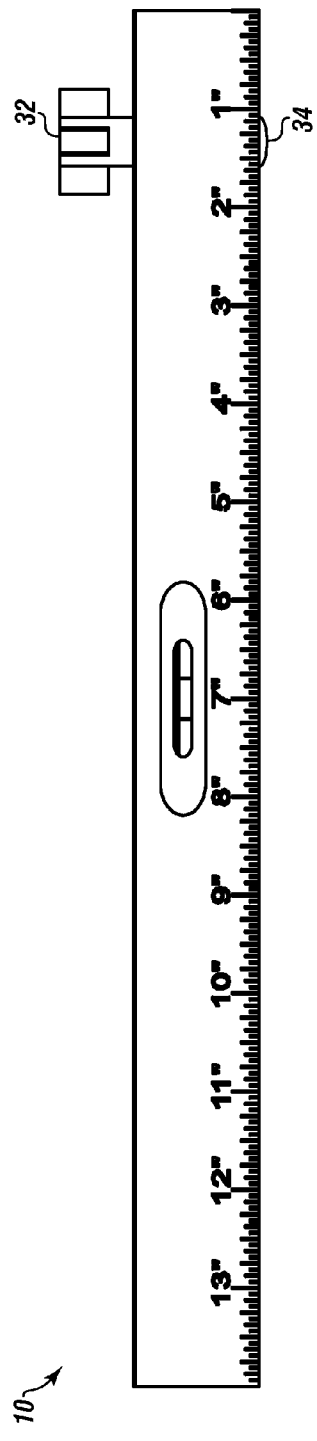
FIG. 3B depicts a side view of the measuring device of FIG. 3A.
Figure 3C:
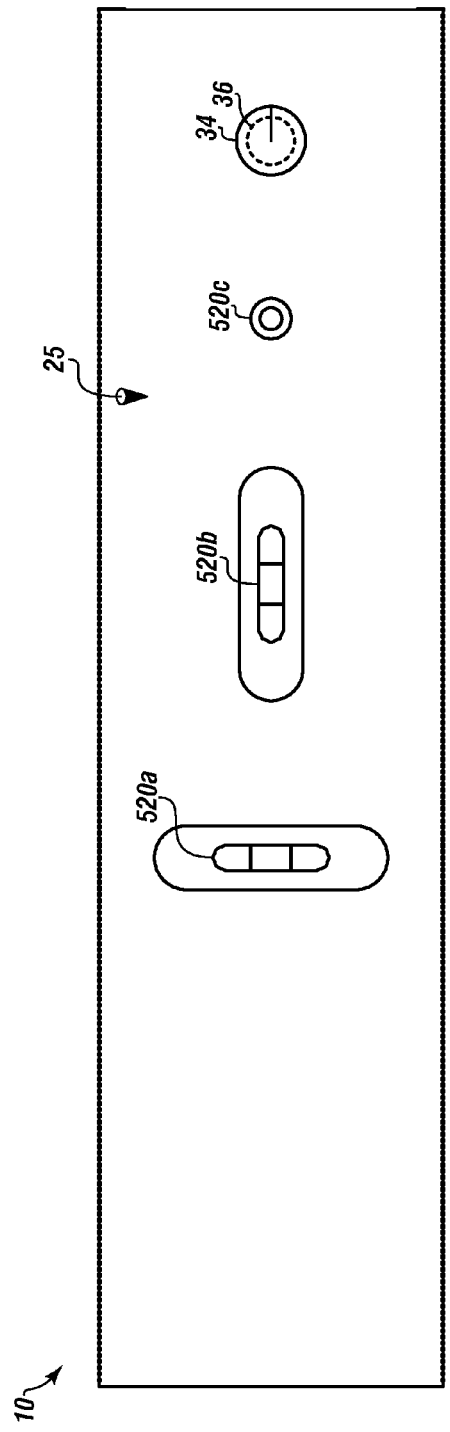
FIG. 3C depicts a bottom view of the measuring device of FIG. 3A.

FIG. 3A depicts a top perspective view of an embodiment of the measuring device 10, FIG. 3B depicts a side view of the measuring device 10 of FIG. 3A, FIG. 3C depicts a bottom view of the measuring device 10 of FIG. 3A, and FIG. 3D depicts a bottom perspective view of the measuring device 10 of FIG. 3A in an extended position.

The measuring device 10 can include one or more fifth levels 520a, 520b, and 520c disposed in or on the lower bottom surface 25. The fifth levels 520a, 520b, and 520c can be electronic levels, spirit levels, or bubble levels. In one or more embodiments, at least one of the fifth levels 520a, 520b, and 520c, such as fifth level 520a can be axially aligned with the second axis, at least one of the fifth levels 520a, 520b, and 520c, such as fifth level 520b can be axially aligned with the first axis, and at least one of the fifth levels 520a, 520b, and 520c, such as fifth level 520c can be a bubble level; thereby allowing for leveling along a plurality of axes.

In one or more embodiments, one or more sixth levels 620 can be disposed in or on the upper bottom surface 13.

In one or more embodiments, the locking mechanism can include a locking bolt 34 disposed through a hole 36 in the lower guide. The locking bolt 34 can extend through the lower guide and through a portion of a slot 38 in the upper guide. The locking bolt 34 can engage the locking knob 32 above the upper guide.

The locking knob 32 can be configured to threadably engage the locking bolt 34 to maintain the position of the upper guide relative to the lower guide. The locking knob 32 can be configured to threadably disengage the locking bolt 34 to allow for extension and retraction of the upper guide relative to the lower guide.

The lower bottom surface 25 can be a flat surface configured to engage flush with a work surface.

The measuring device 10 can include one or more bottom surface lower rulers 40a and 40b disposed on the lower bottom surface 25. A first bottom surface lower ruler 40a can have fifth units 424a-424m, and a second bottom surface lower ruler 40b can have sixth units 524a-524m. The fifth units 424a-424m and the sixth units 524a-524m can increase in the first direction.

The measuring device 10 can include one or more bottom surface upper rulers 42a and 42b disposed on the upper bottom surface 13. A first bottom surface upper ruler 42a can have seventh units 624a-624g, and a second bottom surface upper ruler 42b can have eighth units 724a-724g.

The seventh units 624a-624g and the eighth units 724a-724g can increase in the first direction.

In one or more embodiments, the seventh units 624a-624g can be configured to allow for measurement of a distance beyond a length of the lower guide. For example, the seventh units 624a-624g can be sequential with the fifth units 424a-424m. In operation, the user can extend the upper guide relative to the lower guide. As such, the first lower end 27a of the lower guide can be aligned with one of the seventh units 624a-624g to provide a measurement between the second lower end 27b and the first upper end 29a. For example, the first lower end 27a is depicted in alignment with the seventh unit 624g; thereby indicating that the distance between the second lower end 27b and the first upper end 29a is equivalent to the seventh unit 624g, here shown as twenty-one inches.

The eighth units 724a-724g can begin at zero at the first upper end 29a. As such, the user can measure a distance between the first lower end 27a and the first upper end 29a, which can be used to measure a distance from a wall, corner, or any other point or surface engaged with the first upper end 29a.

Also, the second bottom surface lower ruler 40b and the second bottom surface upper ruler 42b can be used to provide measurements of distances from each end of a space.

Figure 4A:
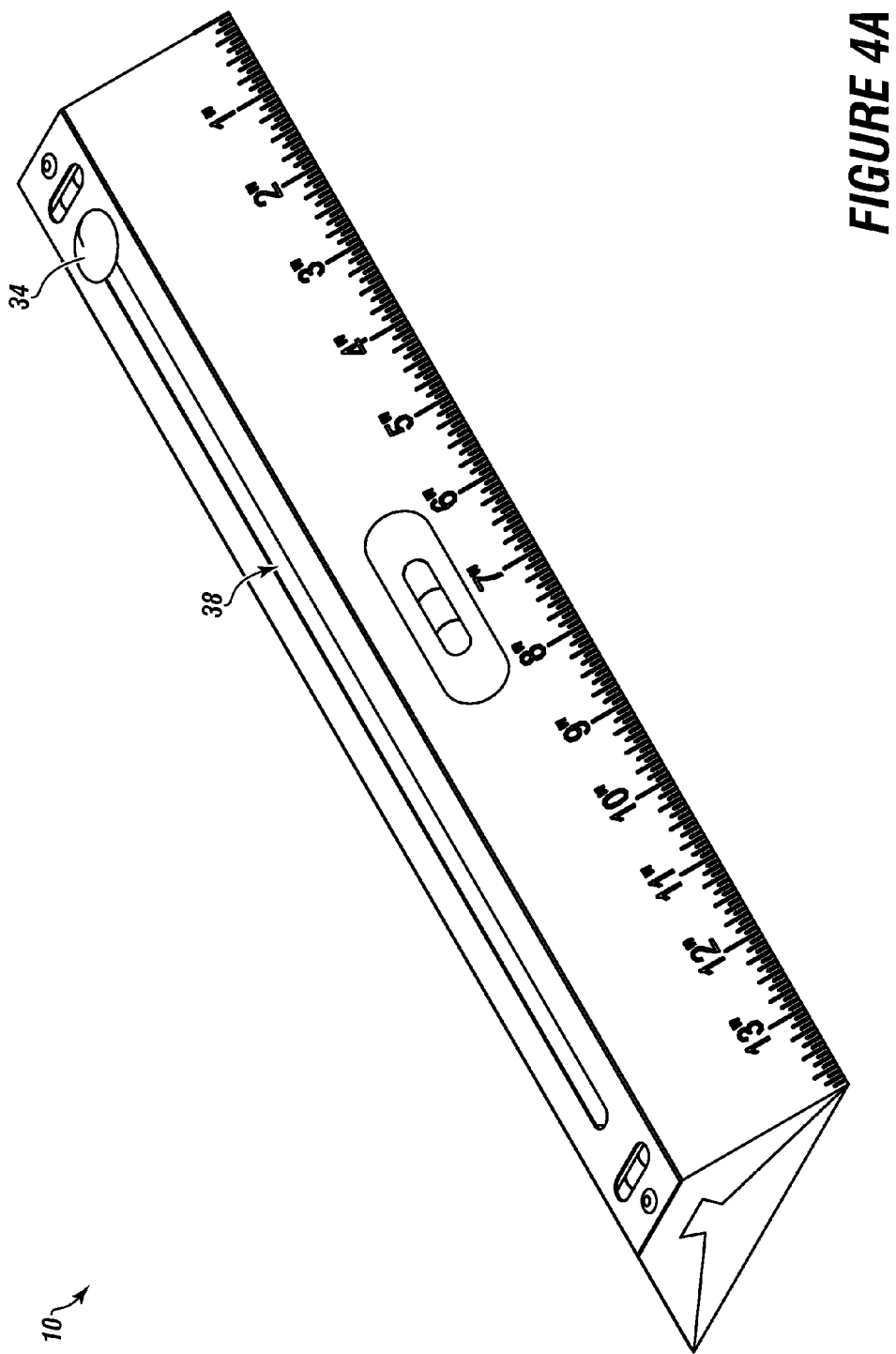
FIG. 4A depicts a top perspective view of another embodiment of the measuring device having the locking knob disposed below the lower guide.
Figure 4B:
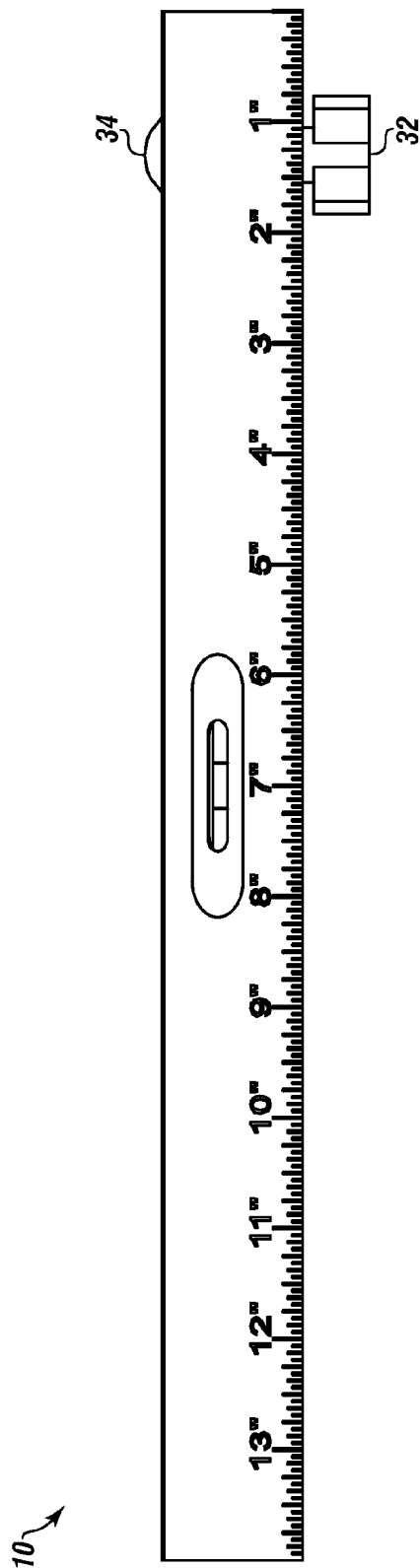
FIG. 4B depicts a side view of the measuring device of FIG. 4A.
Figure 4C:
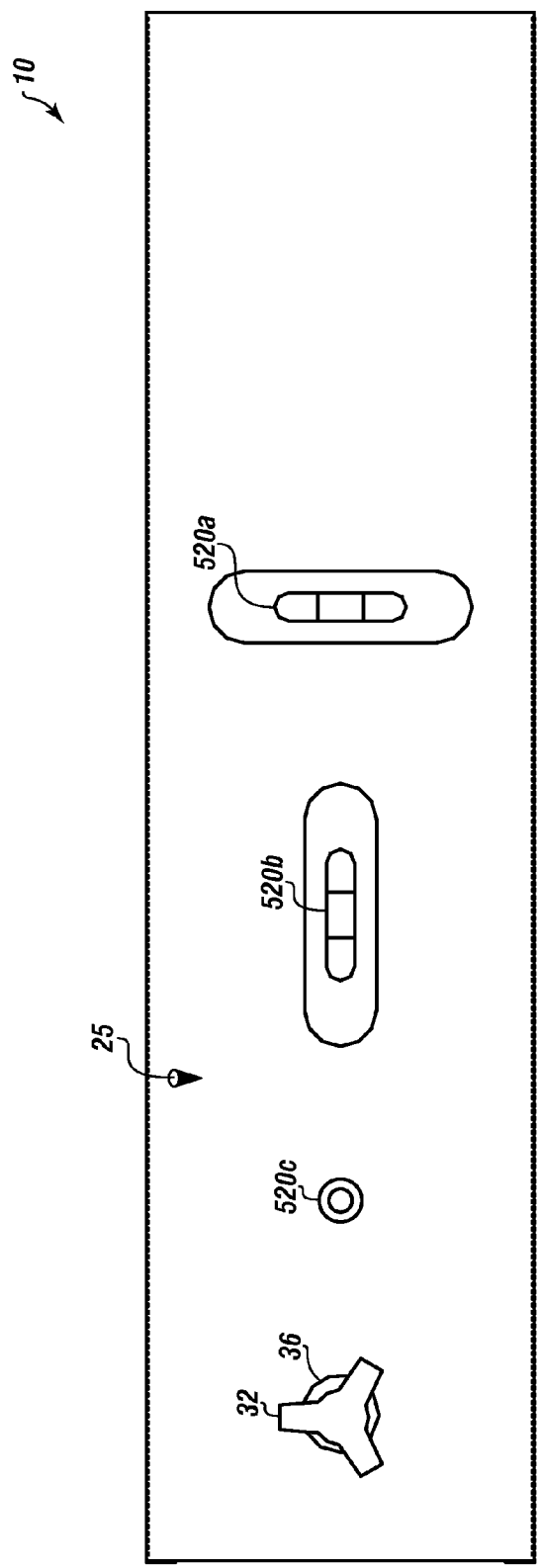
FIG. 4C depicts a bottom view of the measuring device of FIG. 4A.

FIG. 4A depicts a top perspective view of an embodiment of the measuring device 10, FIG. 4B depicts a side view of the measuring device 10 of FIG. 4A, and FIG. 4C depicts a bottom view of the measuring device 10 of FIG. 4A.

The measuring device 10 can include one or more fifth levels 520a, 520b, and 520c disposed in or on the lower bottom surface 25. The fifth levels 520a, 520b, and 520c can be electronic levels, spirit levels, bubble levels, or combinations thereof.

In one or more embodiments, the locking mechanism can include the locking bolt 34 disposed through the slot 38 in the upper guide. The locking bolt 34 can extend through the upper guide and through a portion of the hole 36 in the lower guide. The locking bolt 34 can engage the locking knob 32 below the lower guide.

Figure 5A:
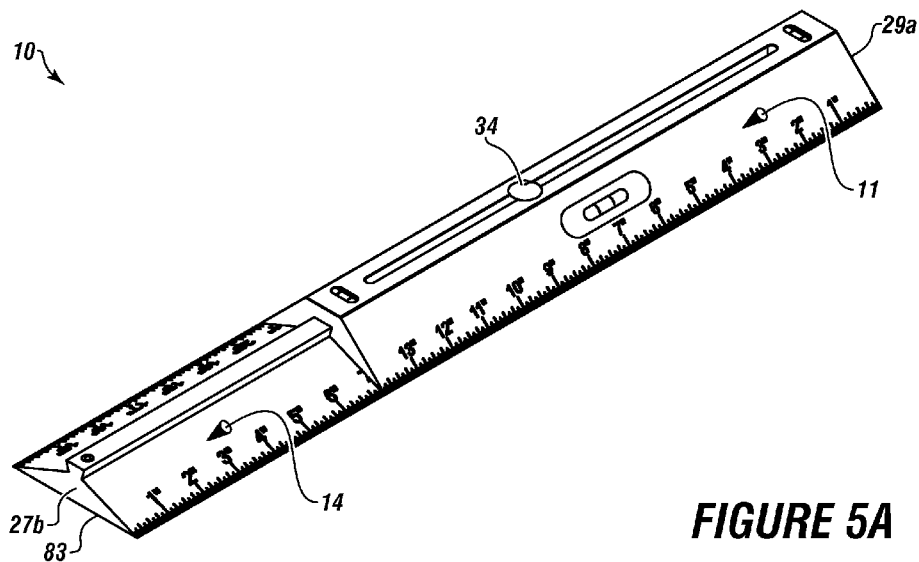
FIGS. 5A-5B depict an embodiment of the measuring device having an end plate connected therewith and the locking knob disposed below the lower guide.
Figure 5B:
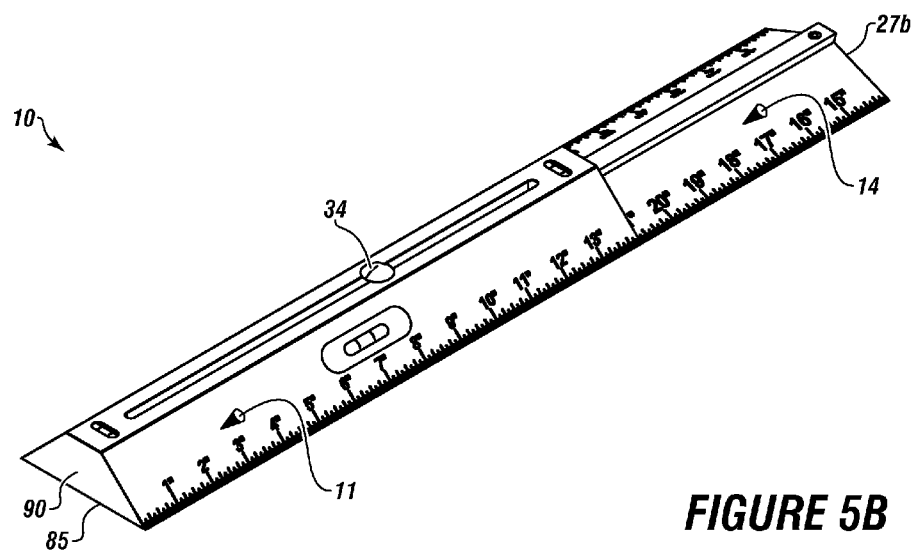

FIGS. 5A-5B depict an embodiment of the measuring device 10 having an end plate 90 connected with the first upper end 29a. The end plate 90 can form an upper end straightedge 85.

As such, the lower end straightedge 83 at the second lower end 27b and the upper end straightedge 85 can be used for testing straight lines and surfaces, cutting along straight lines and surfaces, or drawing straight lines on surfaces.

The measuring device 10 with the end plate 90 can have the locking bolt 34 disposed through the upper guide 11 and into the lower guide 14 for engagement with the locking knob.

Figure 6A:
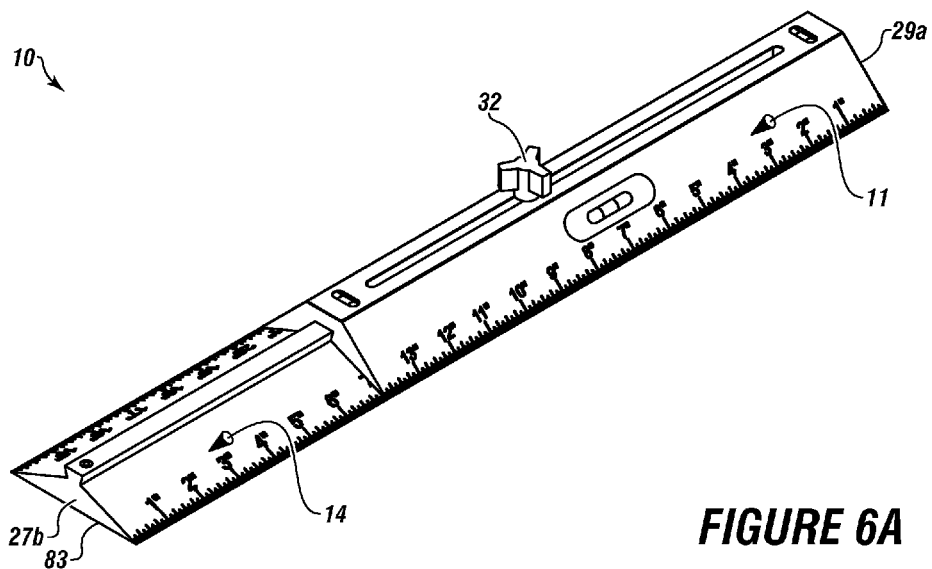
FIGS. 6A-6B depict an embodiment of the measuring device having the end plate connected therewith and the locking knob disposed above the upper guide.
Figure 6B:
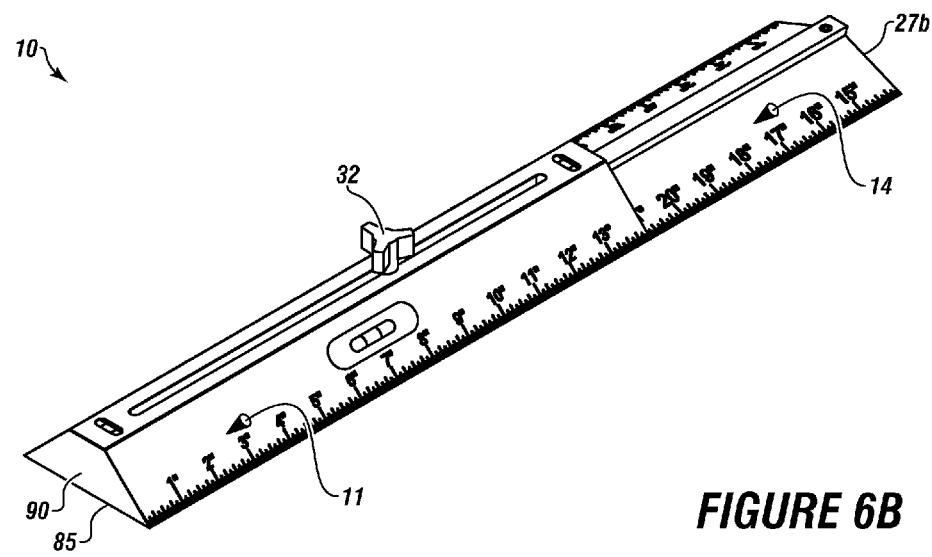

FIGS. 6A-6B depict an embodiment of the measuring device 10 having the end plate 90 connected with the first upper end 29a forming the upper end straightedge 85, and the lower end straightedge 83 formed at the second lower end 27b.

The measuring device 10 with the end plate 90 can have the locking knob 32 engaged with the locking bolt, which can be disposed through the lower guide 14 and into the upper guide 11.

Figure 7A:
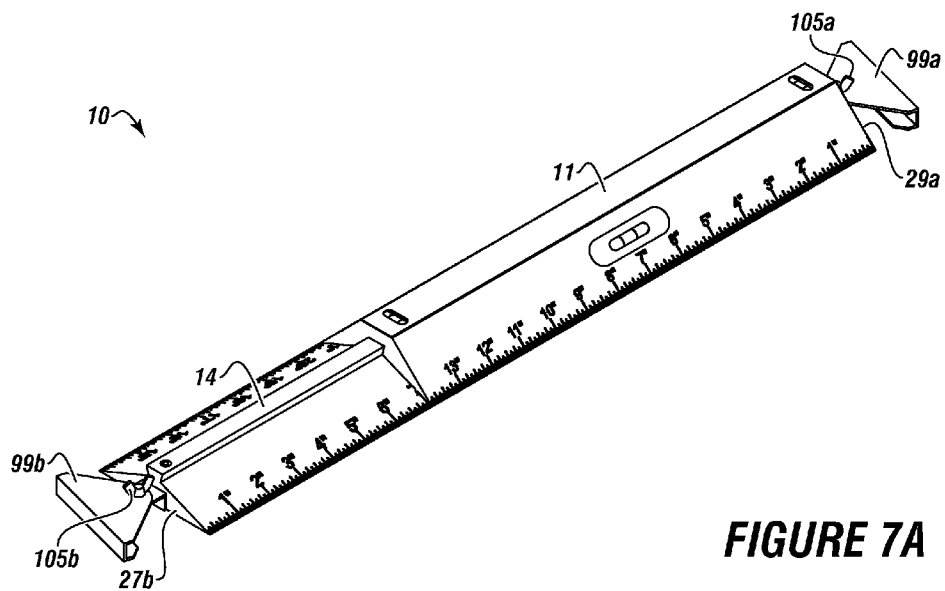
FIGS. 7A-7B depict an embodiment of the measuring device having pivoting feet.
Figure 7B:
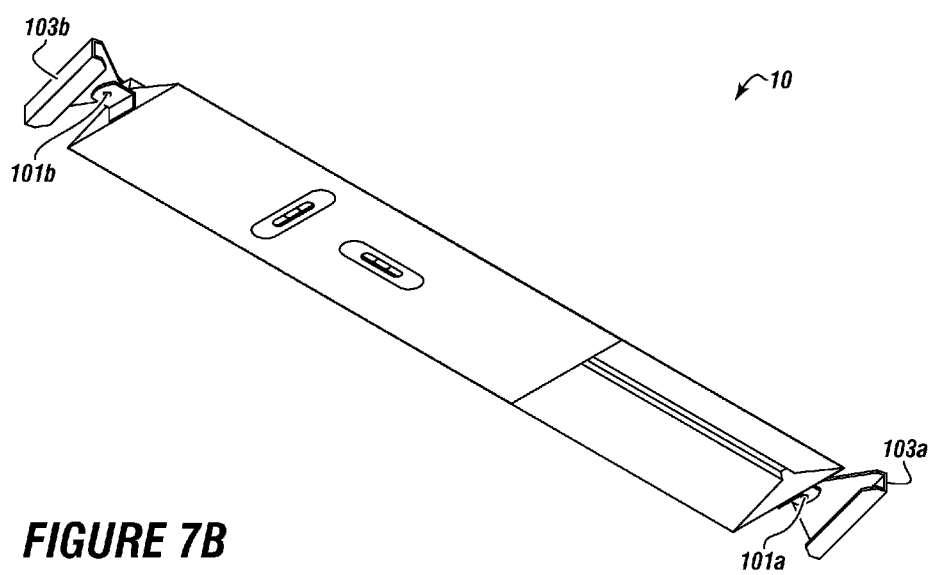

FIGS. 7A-7B depicts an embodiment of the measuring device 10 having pivoting feet.

The embodiment of the measuring device 10 can be configured to function without an active locking mechanism. The upper guide 11 and the lower guide 14 can each be formed to have tolerances configured such that a force above a preset limit is required to move the upper guide 11 relative to the lower guide 14. For example, the upper guide 11 and the lower guide 14 can be machined to dimensions within an allowable deviation. As such, the upper guide 11 can be moved to a position, such as for measuring, and that position can be maintained during the measuring unless a force above the preset limit is applied to the upper guide 11, the lower guide 14, or combinations thereof.

The measuring device 10 can have pivoting feet 99a and 99b. For example, the first pivoting foot 99a can be attached to the upper guide 11 at the first upper end 29a, and the second pivoting foot 99b can be attached to the lower guide 14 at the second lower end 27b.

Each pivoting foot 99a and 99b can have a pivot means 101a and 101b, such as a pin connection, for pivoting relative to the upper guide 11 and the lower guide 14.

Each pivoting foot 99a and 99b can have an engagement surface 103a and 103b.

Each pivoting foot 99a and 99b can have a pivot locking means 105a and 105b, such as a wing nut, for locking a position of the pivoting feet 99a and 99b. In one or more embodiments, the pivoting feet 99a and 99b can be locked in place using a friction fit, other locking means, or the like. The friction fit can be such that a force greater than a predetermined friction force has to be applied to the pivoting foot to move the pivoting foot.

The pivoting feet 99a and 99b can be used to engage walls or other surfaces that are disposed nonparallel to one another.

For example, the first engagement surface 103a can be engaged with a first surface, and the second engagement surface 103b can be engaged with a second surface, such as a second surface disposed nonparallel to the first surface. The pivoting means 101a and 101b can allow the pivoting feet 99a and 99b to pivot; thereby allowing the engagement surfaces 103a and 103b to simultaneously engage with the first surface and the second surface. The pivot locking means 105a and 105b can lock the position of the pivoting feet 99a and 99b after the engagement surfaces 103a and 103b are engaged with the first surface and the second surface. As such, the measuring device 10 can be used to measure, level, and provide straightedges between surfaces that are disposed nonparallel to one another.

While these embodiments have been described with emphasis on the embodiments, it should be understood that within the scope of the appended claims, the embodiments might be practiced other than as specifically described herein.

What is claimed is:

1. A measuring device comprising:
   a. an upper guide comprising an upper top surface and an upper bottom surface, wherein the upper guide further comprises a first upper end connected between the upper top surface and the upper bottom surface, a second upper end connected between the upper top surface and the upper bottom surface opposite the first upper end, and an end plate engaged with the first upper end, thereby forming an upper end straightedge; and
   b. a lower guide comprising a lower top surface and a lower bottom surface, wherein the upper bottom surface is movably engaged with the lower top surface, wherein the upper guide is extendable relative to the lower guide in a first direction along a first axis, wherein the upper guide is retractable relative to the lower guide in a second direction along the first axis, wherein the second direction is opposite the first direction, and wherein a first straightedge is formed along a first side of the upper guide, the lower guide, or combinations thereof; and wherein a position of the lower guide relative to the upper guide is maintained to form a template, wherein the template allows for repeated operations based upon a fixed length along the first axis defined by the upper guide and the lower guide.

2. The measuring device of claim 1, wherein the first straightedge has a length that is increasable by extending the upper guide relative to the lower guide.

3. The measuring device of claim 1, further comprising one or more rulers on the upper guide, the lower guide, or combinations thereof.

4. The measuring device of claim 1, further comprising one or more levels on the upper guide, lower guide, or both, wherein the one or more levels are each selected from a member of the group consisting of: an electronic level, a spirit level, or a bubble level.

5. The measuring device of claim 4, wherein the one or more levels are disposed in or on the lower top surface, the lower bottom surface, the upper top surface, the upper bottom surface, or combinations thereof.

6. The measuring device of claim 1, wherein the position of the lower guide relative to the upper guide is maintained by a locking mechanism operatively engaged with the upper guide and the lower guide.

7. The measuring device of claim 1, wherein the upper guide has a profile configured to engage within a corner of two surfaces.

8. The measuring device of claim 7, wherein the profile of the upper guide comprises:
   a. a flat top surface extending along the first axis;
   b. a first upper angled top surface connected with the flat top surface, wherein the first upper angled top surface is disposed at a first upper angle from the flat top surface; and
   c. a second upper angled top surface connected with the flat top surface opposite the first upper angled top surface, wherein the second upper angled top surface is disposed at a second upper angle from the flat top surface, and wherein the first upper angle is equal to the second upper angle.

9. The measuring device of claim 8, wherein the first upper angle and the second upper angle are both forty five degree angles.

10. The measuring device of claim 1, wherein the upper guide and the lower guide engage one another with a boss and groove connection.

11. The measuring device of claim 1, wherein the lower bottom surface is a flat surface configured to engage flush with a work surface.

12. The measuring device of claim 1, wherein:
   a. the lower guide comprises a first lower end connected between the lower top surface and the lower bottom surface, and a second lower end connected between the lower top surface and the lower bottom surface opposite the first lower end; and
   b. the first lower end and the second lower end each form a lower end straightedge.

13. The measuring device of claim 1, wherein the measuring device is configured to be:
   a. extended, retracted, or combinations thereof to fit within a space; and b. locked in position to a length equivalent to a distance of the space, thereby providing a measurement of the distance of the space without requiring a numerical identification of the measurement.

14. The measuring device of claim 1, wherein the upper guide and the lower guide each have tolerances configured such that a force above a preset limit is required to move the upper guide relative to the lower guide.

15. The measuring device of claim 1, further comprising a first pivoting foot attached to the upper guide at a first upper end and a second pivoting foot attached to the lower guide at a second lower end, wherein the first pivoting foot and the second pivoting foot are configured to engage surfaces that are disposed nonparallel to one another.

16. A measuring device comprising:
   a. an upper guide, wherein the upper guide further comprises a first upper end connected between the upper top surface and the upper bottom surface, a second upper end connected between the upper top surface and the upper bottom surface opposite the first upper end, and an end plate engaged with the first upper end, thereby forming an upper end straightedge; and
   b. a lower guide connected with the upper guide by means of a boss and groove, wherein the lower guide can be moved relative to the upper guide to fit within a space, and wherein a desired position of the lower guide is maintained to form a template, allowing for direct measurement without the use of unit based rulers and providing the template allowing for repeated operations that are based upon a fixed length, wherein the upper guide and the lower guide form a straightedge.

17. The measuring device of claim 16, further comprising one or more levels located on the upper guide, the lower guide, or combinations thereof.

18. The measuring device of claim 17, further comprising one or more rulers on the upper guide, the lower guide, or combinations thereof.

19. A measuring device comprising:
   a. an upper guide, wherein the upper guide further comprises a first upper end connected between the upper top surface and the upper bottom surface, a second upper end connected between the upper top surface and the upper bottom surface opposite the first upper end, and an end plate engaged with the first upper end, thereby forming an upper end straightedge;
   b. a lower guide connected with the upper guide, wherein the lower guide can be moved relative to the upper guide to fit within a space, and wherein a desired position of the lower guide is maintained to form a template, allowing for direct measurement without the use of unit based rulers and providing the template allowing for repeated operation that are based upon a fixed length, wherein the lower guide and the upper guide form a straightedge; and
   c. one or more rulers on the upper guide, the lower guide, or combinations thereof.

* * * * *